United States Patent
Macaluso et al.

(10) Patent No.: US 9,427,015 B2
(45) Date of Patent: Aug. 30, 2016

(54) PALATE CLEANSING BEVERAGE AND METHOD OF MAKING AND USING THE SAME

(75) Inventors: Andrew Macaluso, San Luis Obispo, CA (US); Nicole Amy Chamberlain, San Luis Obispo, CA (US)

(73) Assignee: SANTASTI, INC., Encinitas, CA (US)

( * ) Notice: Subject to any disclaimer, the term of this patent is extended or adjusted under 35 U.S.C. 154(b) by 892 days.

(21) Appl. No.: 12/098,984

(22) Filed: Apr. 7, 2008

(65) Prior Publication Data

US 2009/0252835 A1    Oct. 8, 2009

(51) Int. Cl.
| A23L 1/05 | (2006.01) |
| A23L 2/40 | (2006.01) |
| A23L 2/38 | (2006.01) |
| A23L 2/52 | (2006.01) |
| A23L 2/54 | (2006.01) |
| A23L 2/56 | (2006.01) |
| A23L 2/68 | (2006.01) |

(52) U.S. Cl.
CPC .. *A23L 2/40* (2013.01); *A23L 2/38* (2013.01); *A23L 2/52* (2013.01); *A23L 2/54* (2013.01); *A23L 2/56* (2013.01); *A23L 2/68* (2013.01)

(58) Field of Classification Search
CPC .............. A23L 2/38; A23L 2/40; A23L 2/68
USPC .................................. 426/590, 573, 577, 427
See application file for complete search history.

(56) References Cited

U.S. PATENT DOCUMENTS

| 5,389,387 A | 2/1995 | Zuniga et al. |
| 2003/0099753 A1 | 5/2003 | Yang et al. |
| 2005/0260322 A1 | 11/2005 | Takaichi et al. |
| 2006/0099318 A1 | 5/2006 | Iwasaki et al. |

FOREIGN PATENT DOCUMENTS

JP    59-063137    4/1984

OTHER PUBLICATIONS

International Search Report and Written Opinion from PCT/US09/039166 dated Nov. 11, 2009.

*Primary Examiner* — Helen F Heggestad
(74) *Attorney, Agent, or Firm* — Norton Rose Fulbright Canada LLP; Maya Medeiros

(57) ABSTRACT

A beverage specifically designed for cleansing the palate, hereafter a palate cleansing beverage ("PCB"), is a carbonated beverage made of water, citric acid, pectin, sucrose, carboxymethyl cellulose sodium, and carbon dioxide to cleanse the palate.

4 Claims, 2 Drawing Sheets

PALATE CLEANSING BEVERAGE AND METHOD OF MAKING AND USING THE SAME

FIELD OF THE INVENTION

The field of the invention relates in general to palate cleansing foods/beverages.

BACKGROUND OF THE INVENTION

Ingestion of foods and beverages which cause palate fatigue can negatively affect subsequent ingestions. This is a concern for professionals in the beverage and food sectors as well as consumers in their general appreciation of sensory experiences. For example, winery tasting rooms may try to avoid the palate fatigue problem by pouring wines from white to red and lightest to heaviest astringencies. If unmitigated, this unavoidable problem combined with tasting order biases will have a substantial role on quality perception and therefore negatively misrepresent the product. Currently, the only approaches to solving palate fatigue include water, carbonated water, and crackers or bread. These options are readily available, but are not intended as palate cleansers. They may wash flavors away, but lack the ability to solve the entire problem.

Although inexpensive and portable, crackers and bread can be awkward to consume in between ingestions, leave particles on the palate, and lack the convenience and hydrating power of a beverage.

Often carbonated water may have such a high level of carbonation that it causes sensations of pain on the tongue which can negatively affect the sensory experience.

A need exists for a true palate cleansing beverage that alleviates palate fatigue, allowing for accurate perception of multiple foods and beverages.

Palate fatigue is caused by adaptation—a change in sensitivity to a given stimulus as a result of continued ingestion of that stimulus or a very similar one. Palate fatigue is temporary, but can severely limit the ability to distinguish the stimulus in question. A major concern of wine, tea, beer, coffee or other beverage and food consumers and producers is the continual ingestion of chemical compounds known as tannins. Tannin is the general term used for any large molecular weight plant polyphenol that generally tastes both astringent and bitter when consumed. FIG. 3 is the base unit for most tannin compounds. Tannins are water soluble, have molecular weights in the 500-3000 range and can interact with proteins and polyamides due to the large quantities of hydroxyls and other such groups.

Astringency and bitterness are a sensation and basic taste respectively. Astringency is the puckering or dryness of the mouth that arises through the ingestion of tannic foods. This sensation is caused by salivary proteins precipitating as protein-tannin complexes, decreasing the lubricating effect of saliva. Bitterness is one of the five tastes that are received through taste buds: bitter, salty, sour, sweet, and umami. The two often go together in many beverages and foods: coffee, wine, tea, beer, fruits, legumes, condiments, etc. Although they may both be caused by tannins they are perceived differently and astringency often masks bitterness.

A palate cleanser is a food or beverage which helps to minimize any carryover or adaptation from one beverage or food to the next. In other words, it removes the stimulus that is causing or could cause palate fatigue without imparting any hindering flavors of its own or affecting the consumption of the subsequent food or beverage.

SUMMARY OF THE INVENTION

An aspect of the invention involves a beverage specifically designed for cleansing the palate, hereafter a palate cleansing beverage ("PCB"). The PCB is a carbonated beverage with food additives that help to cleanse the palate. In a preferred embodiment, the food additives include citric acid, pectin, sucrose, carboxymethyl cellulose sodium, and carbon dioxide. The combination and concentration of these additives are crucial to creating a beverage that cleanses the palate without leaving behind any flavors or sensations that could affect subsequent ingestions. The additives in PCB are not limited to those above, but include any such compound that aids in neutralizing the palate, especially through the removal of tannins.

BRIEF DESCRIPTION OF THE DRAWINGS

The accompanying drawings, which are incorporated in and form a part of this specification, illustrate the logic flow of the invention and its embodiments, and together with the description, serve to explain the principles of this invention.

DETAILED DESCRIPTION OF THE INVENTION

Figure 1:
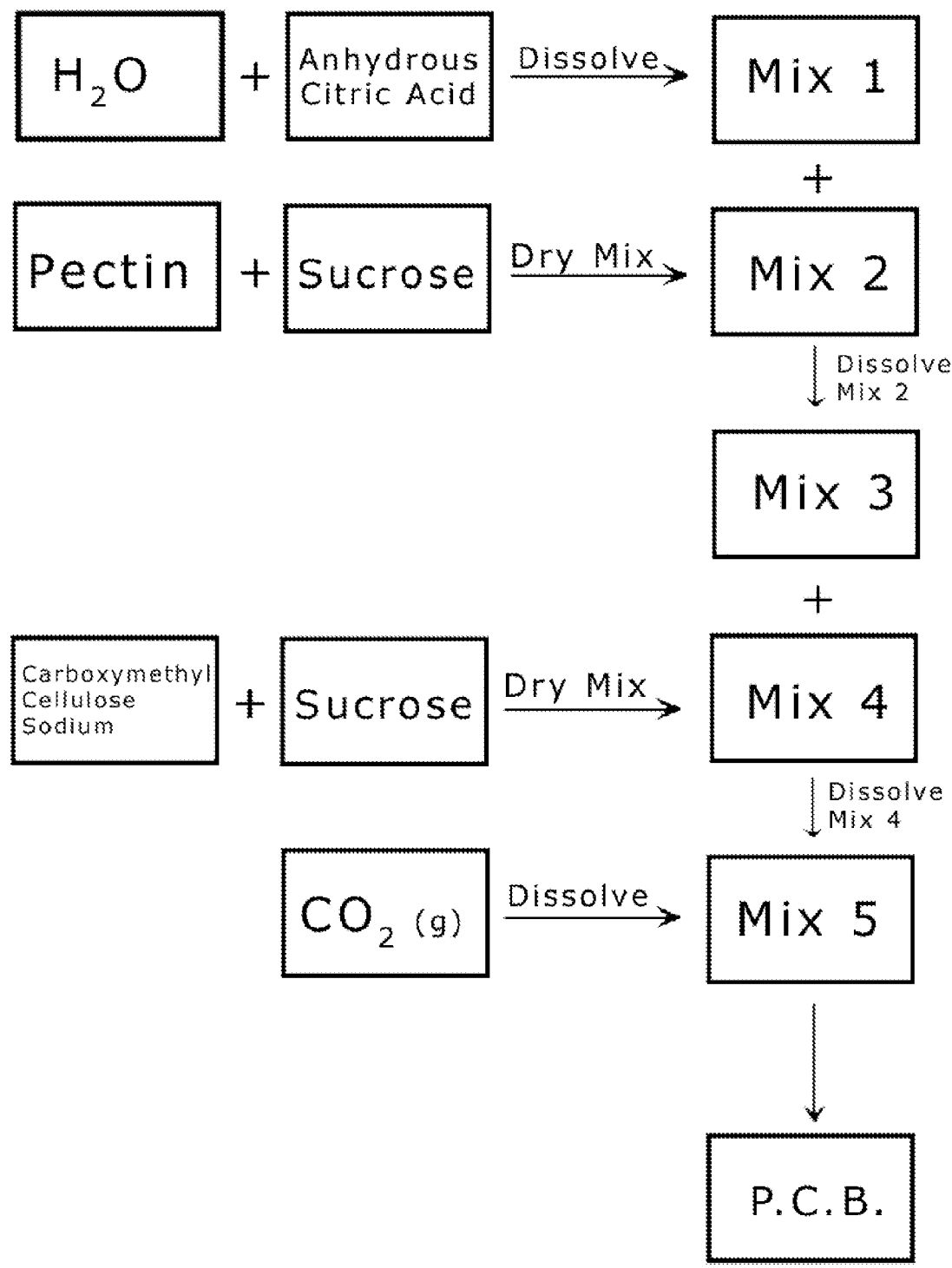
FIG. 1 is a flow chart of an exemplary method for making the palate cleansing beverage.

With reference to FIG. 1, a method of manufacturing a palate cleansing beverage ("PCB") will now be described. As used herein, the term "beverage" refers to a beverage composition which is in a single-strength, ready-to-serve, drinkable form. Beverages of the present invention typically comprise at least 80% (preferably at least 85%) water. As used herein, a "tannin removal additive" means one or more additives that form complexes with tannin compound(s) (negatively charged polyphenols with high molecular weights), effectively removing the tannin compound(s) from the mouth.

As used herein, the term "comprising" means various components can be conjointly employed in the beverages and beverage concentrates of the present invention. Accordingly, the term "comprising" encompasses the more restrictive terms "consisting essentially of" and "consisting of".

The method of manufacturing a PCB will now be described below. The additives shown in FIG. 1 are mixed in the order shown for production and tactile reasons.

First, anhydrous citric acid is dissolved in water to form Mix 1. Manufacture of the PCB starts with purified water as it is the ideal foundation for a palate cleansing beverage due to its neutrality and hydration ability. Water is used as a polar solvent to dissolve polar compounds. Anhydrous citric acid is added to lower the pH as well as to increase saliva production which further aids in cleansing. The citric acid is dissolved first as it does so easily and does not affect subsequent additions.

Second, pectin is dry mixed with sucrose producing a dry Mix 2 in order to facilitate rapid hydration. The pectin is a tannin removal additive. The incorporation of pectin is crucial for its ability to form complexes with tannin compounds (negatively charged polyphenols with high molecular weights), thus effectively removing them from the salivary proteins. Sucrose is added to balance the needed acid and other flavors from food additives.

Third, dry Mix 2 is dissolved in Mix 1 to form Mix 3.

Fourth, carboxymethyl cellulose sodium is dry mixed with sucrose to form dry Mix 4 for rapid hydration, but is added after the pectin so as to minimize any increases in viscosity that this additive can cause. Carboxymethyl cellulose sodium, or cellulose gum, is a tannin removal additive and is incorporated for its ability to form complexes with tannin compounds (negatively charged polyphenols with high molecular weights), thus effectively removing them from the salivary proteins.

Finally, fifth, the beverage is carbonated last because agitation of the additives during mixing is not conducive to maintaining carbonation in production. Carbon dioxide produces carbonation in the beverage which helps to normalize the viscosity as well as produce carbonic acid which provides balance for other flavors. The carbonation lends a familiar and pleasant mouthfeel while providing tactile scrubbing on the tongue and mouth.

Figure 2:
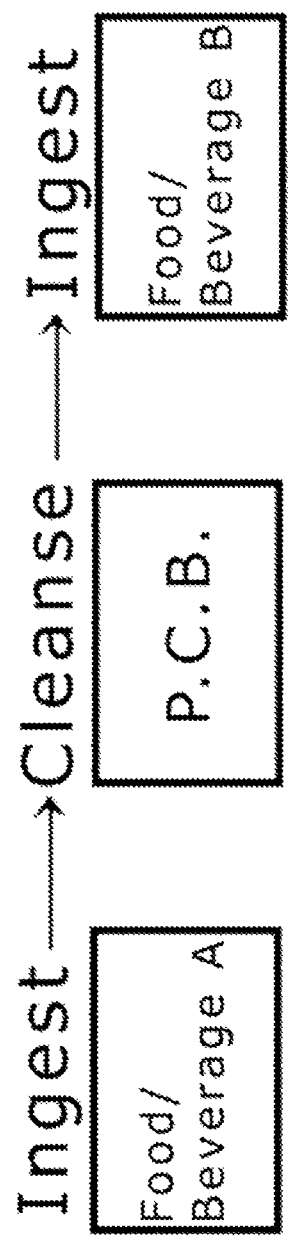
FIG. 2 is a flow chart of an exemplary method of using the palate cleansing beverage.
Figure 3:
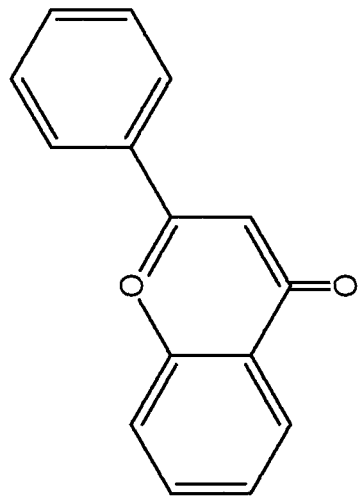
FIG. 3 is a base unit of most tannin compounds.

With reference to FIG. 2, a method of using the PCB for palate cleansing will be described. First, a first food and/or beverage is ingested, or tasted and expelled (e.g., wine tasting). Second, the PCB is ingested, or tasted and expelled. Finally, a second food and/or beverage is ingested, or tasted and expelled.

The PCB cleanses the palate significantly better than water or carbonated water alone. The PCB and method of use enables food/beverage customers and producers to experience the food or beverage as intended. They will be able to taste more flavors from more foods that palate fatigue would otherwise dull or conceal.

SPECIFIC EMBODIMENT OF BEVERAGE AND METHOD FOR MAKING SAME ACCORDING TO THE PRESENT INVENTION

The following is a specific embodiment of a beverage and method for making same in accordance with the present invention.

The PCB was prepared as follows:
1. Citric acid 0.5 g/L is added to purified 1000 g water resulting in Mix 1.
   a. The citric acid is stirred until completely dissolved.
2. Pectin 1 g/L is dry mixed with sucrose 2.5 g/L resulting in Mix 2.
3. Mix 1 is added to Mix 2 resulting in Mix 3
   a. Mix 2 is stirred until completely dissolved in Mix 1
4. Carboxymethyl Cellulose Sodium 0.5 g/L is dry mixed with sucrose 2.5 g/L resulting in Mix 4.
5. Mix 4 is added to Mix 3 resulting in Mix 5.
   a. Mix 4 is stirred until completely dissolved in Mix 3.
6. Mix 5 is then chilled to 40-50° F.
7. Mix 5 is then carbonated with $CO_2$.
   a. The range of carbonation is 0.5 to 2.0 Volumes $CO_2$.
8. The resulting beverage is the PCB.
   a. Note that the PCB is best served chilled.

The following ingredients were mixed together in the order and quantities indicated above to provide a beverage mix, Mix 5:

| Ingredient | Amount (g.) |
|---|---|
| Water | 1000 |
| Citric Acid (anhydrous) | 0.5 |
| Sucrose | 5.0 |
| Pectin | 1.0 |
| Carboxymethyl Cellulose Sodium | 0.5 |
| Total | 1007.0 |

The above figures may depict exemplary configurations, compositions, and methods for the invention, which is done to aid in understanding the features and functionality that can be included in the invention. The invention is not restricted to the illustrated configurations, compositions, and methods, but can be implemented using a variety of alternative configurations, compositions, and methods. Additionally, although the invention is described above in terms of various exemplary embodiments and implementations, it should be understood that the various features and functionality described in one or more of the individual embodiments with which they are described, but instead can be applied, alone or in some combination, to one or more of the other embodiments of the invention, whether or not such embodiments are described and whether or not such features are presented as being a part of a described embodiment. Thus the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although item, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

What is claimed is:

1. A method of manufacturing a palate cleansing beverage, using ingredients comprises: dissolving citric acid in water to form a citric acid and water mix; dissolving a pectin and sucrose dry mix into the citric acid and water mix; dissolving a carboxymethyl cellulose sodium and sucrose dry mix into the pectin, sucrose, citric acid, and water mix; and carbonating the pectin, sucrose, citric acid, carboxymethyl cellulose sodium, and water mix to form the palate cleansing beverage, wherein quantities of the ingredients are based on an approximate ratio of being approximately 1000 g of water, 0.5 g/L of the citric acid, 5.0 g/L of the sucrose, 1.0 g/L of the pectin, and 0.5 g/L of the carboxymethyl cellulose sodium.

2. A palate cleansing beverage with ingredients comprising:
   water;
   citric acid to lower pH as well as increase saliva production;
   sucrose to balance the acid and other flavors from food additives;
   one or more tannin removal additives to form complexes with one or more tannin compounds; and
   carbon dioxide to produce carbonation, provide tactile scrubbing on the tongue and mouth, and produce carbonic acid, wherein quantities of the ingredients are based on approximate ratio of 1000 g of the water, 0.5 g/L of the citric acid, 5.0 g/L of the sucrose, and 1.5 g/L of the tannin removal additives.

3. A method of cleansing one's palate, which comprises: at least one of ingesting and tasting at least one of a first food and a first beverage; at least one of ingesting and tasting the palate cleansing beverage of claim 2 to cleanse one's palate; and at least one of ingesting and tasting at least one of a second food and a second beverage.

4. A palate cleansing beverage with ingredients comprising: water; citric acid to lower pH as well as increase saliva production; pectin to form complexes with tannin compounds; sucrose to balance the acid and other flavors from food additives; carboxymethyl cellulose sodium to form complexes with tannin compounds; and carbon dioxide to produce carbonation, provide tactile scrubbing on the tongue and mouth, and produce carbonic acid, wherein quantities of the ingredients are based on an approximate ratio of 1000 g of the water, 0.5 g/L of the citric acid, 5.0 g/L of the sucrose, 1.0 g/L of the pectin, and 0.5 g/L of the carboxymethyl cellulose sodium.

\* \* \* \* \*